June 13, 1961    C. J. STALEGO    2,987,773
PRODUCTION OF GLASS FILAMENTS
Filed Aug. 28, 1956    6 Sheets-Sheet 1
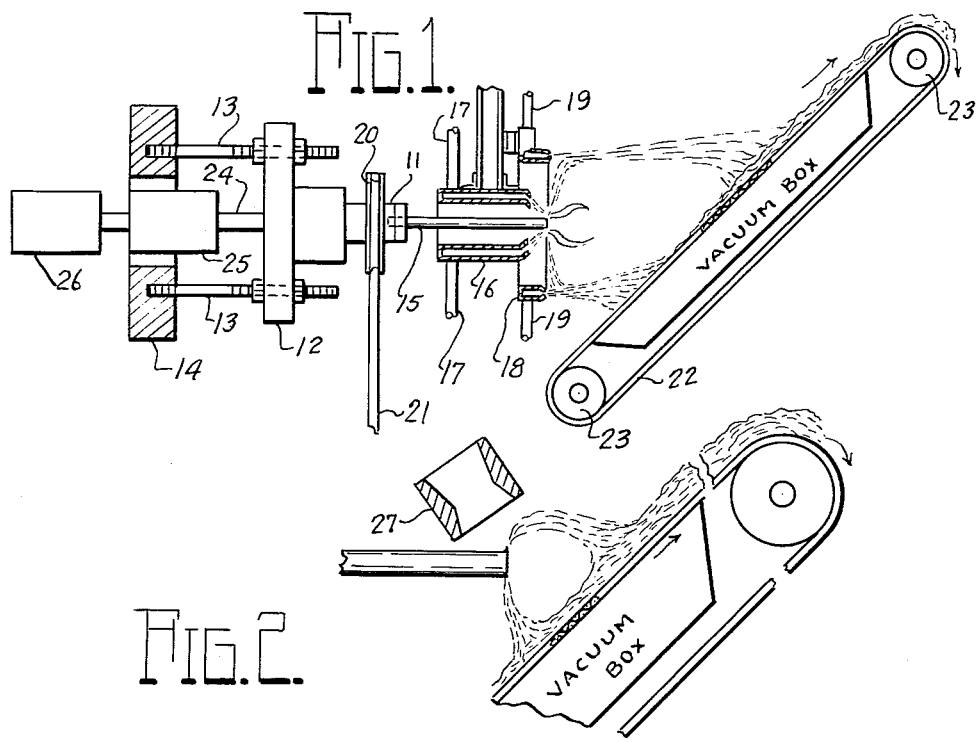
FIG. 1.
FIG. 2.
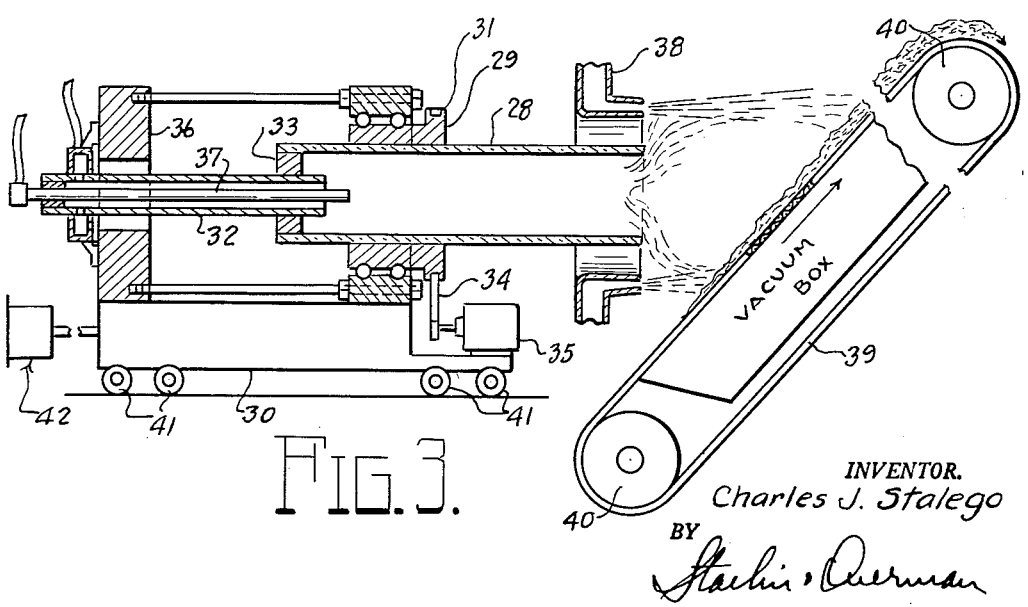
FIG. 3.
INVENTOR.
Charles J. Stalego
BY
ATTORNEYS June 13, 1961  C. J. STALEGO  2,987,773
PRODUCTION OF GLASS FILAMENTS
Filed Aug. 28, 1956  6 Sheets-Sheet 2

INVENTOR.
Charles J. Stalego
BY
ATTORNEYS

June 13, 1961 C. J. STALEGO 2,987,773
PRODUCTION OF GLASS FILAMENTS
Filed Aug. 28, 1956 6 Sheets-Sheet 3
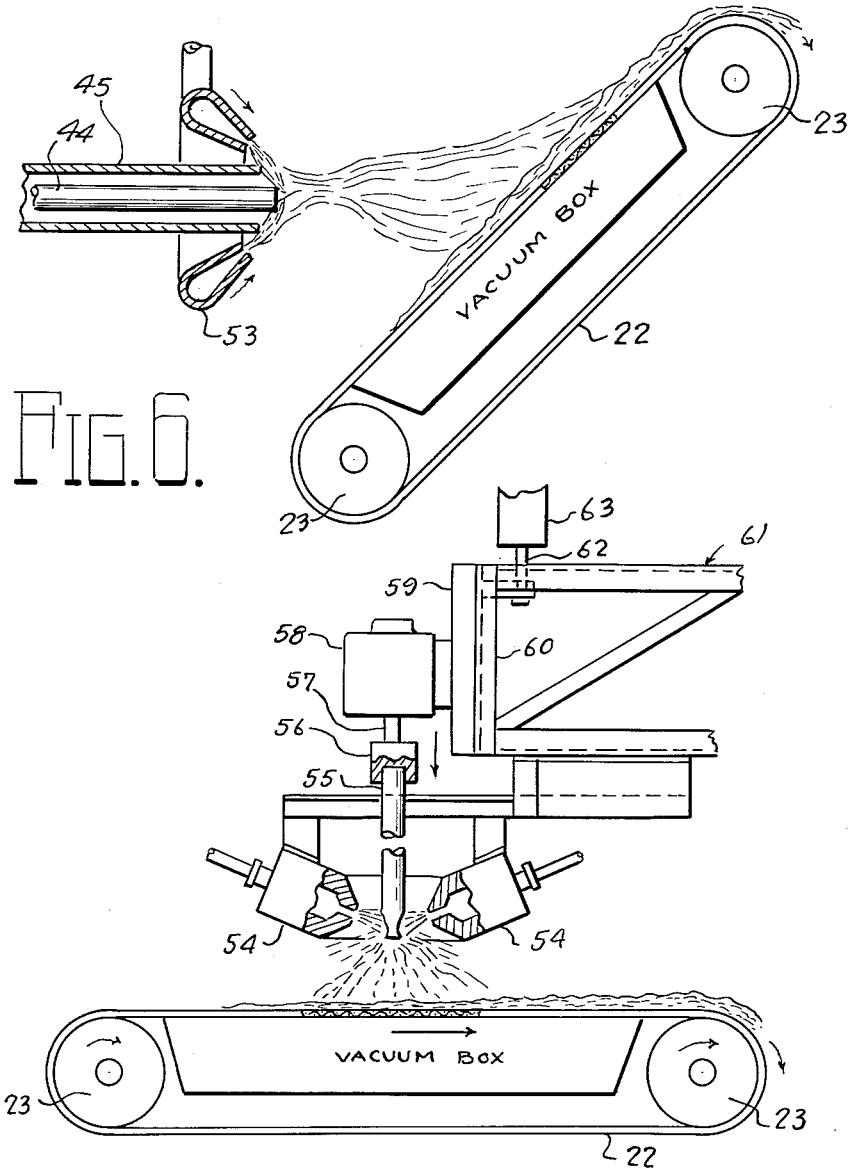
INVENTOR.
Charles J. Stalego
BY
ATTORNEYS June 13, 1961 C. J. STALEGO 2,987,773
PRODUCTION OF GLASS FILAMENTS
Filed Aug. 28, 1956 6 Sheets-Sheet 4
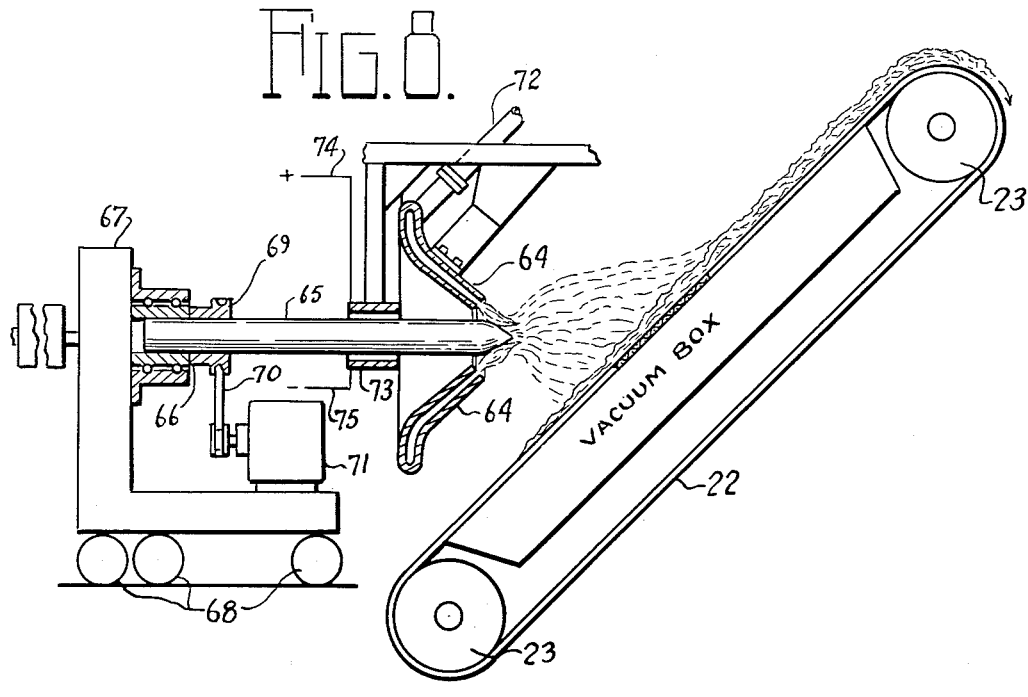
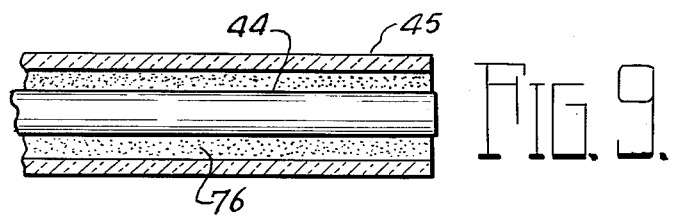
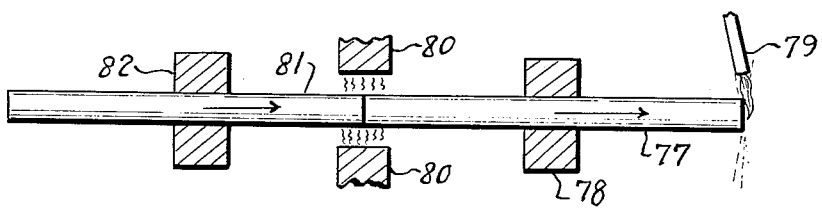
INVENTOR.
Charles J. Stalego
BY
ATTORNEYS June 13, 1961         C. J. STALEGO         2,987,773
PRODUCTION OF GLASS FILAMENTS
Filed Aug. 28, 1956         6 Sheets-Sheet 5
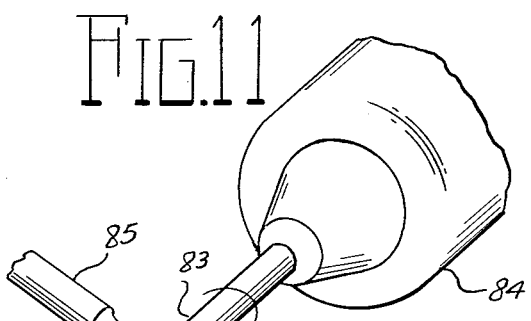
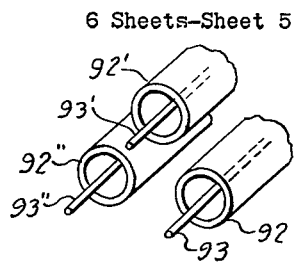
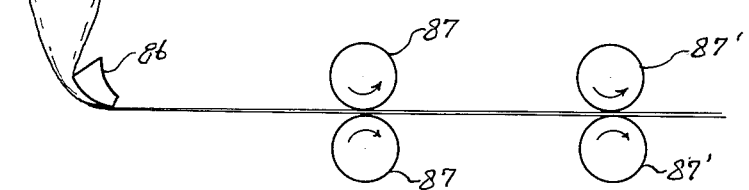
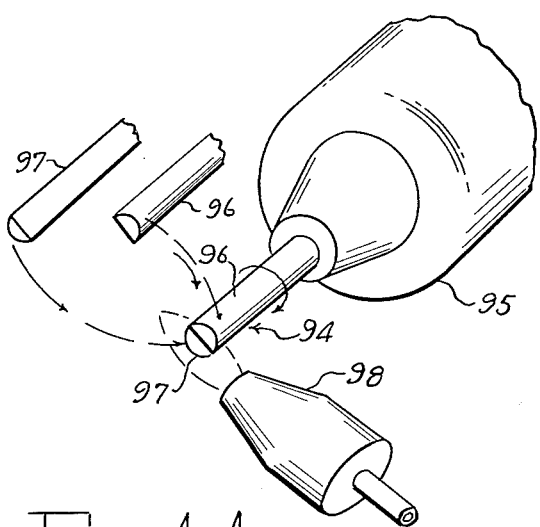
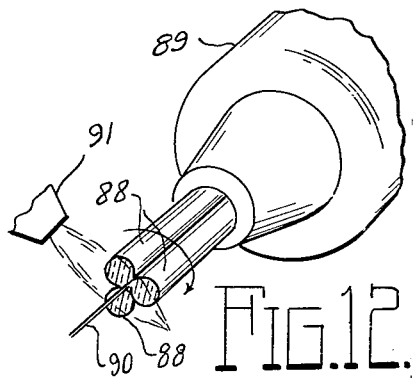
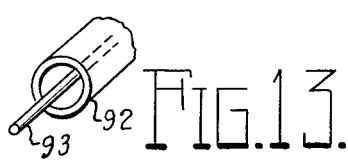
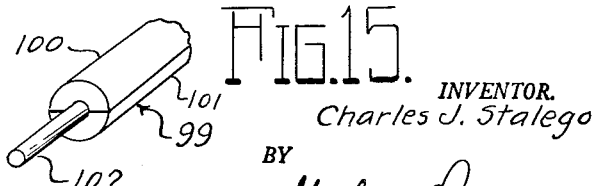
INVENTOR.
Charles J. Stalego
BY
ATTORNEYS

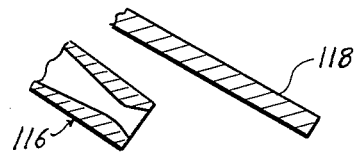
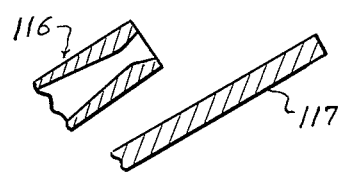
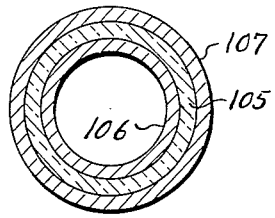
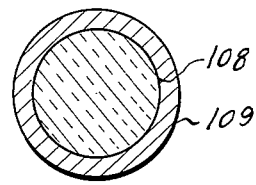
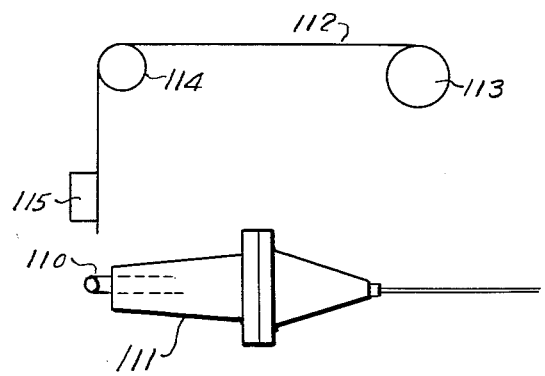
INVENTOR.
Charles J. Stalego

United States Patent Office 2,987,773
Patented June 13, 1961

2,987,773
PRODUCTION OF GLASS FILAMENTS
Charles J. Stalego, Newark, Ohio, assignor to Owens-Corning Fiberglas Corporation, a corporation of Delaware
Filed Aug. 28, 1956, Ser. No. 606,762
5 Claims. (Cl. 18—47.3)

This invention relates to the production of glass filaments or fibers, and, more particularly, to an improved method for the production of fibers of glass or other similar material by rotating a mass of the material while heating a surface thereof.

A recent suggestion for the production of filaments of a fiberizable, fusible material involves spinning a mass of the material while heating a surface thereof to a temperature above the softening temperature of the material. It has been found that relatively high speeds of rotation are required by this method to produce fibers that are sufficiently fine for most uses. It is believed that, during fiberization by this method, fused material is formed by the heating, and is thrown off centrifugally in fiber forming streams which are attenuated during their travel, and that the diameters of the ultimate fibers produced depends upon the centrifugal force, or, for a given radius of rotation, the number of revolutions per unit of time at which the mass is rotated. It is feasible to produce fibers in this manner, using rotational speeds from about 15,000 r.p.m. to about 20,000 r.p.m., although the fibers produced are relatively coarse. This method is disclosed and claimed in a copending application Serial No. 481,330, filed January 12, 1955, now Patent No. 2,916,773. Such a procedure can be utilized to produce small quantities of the comparatively coarse fibers.

The instant invention is based upon the discovery that primary streams of a fiberizable, fused material can be formed by rotating a solid mass of the material while heating an exposed surface thereof to a temperature in excess of its softening temperature, and that the streams can be extended longitudinally to effect attenuation thereof so that filaments are produced which are finer than those which would be produced by centrifugal force only. The invention also contemplates the production of what may be denominated "two-phase filaments" by rotation of a composite mass comprising a fiberizable, fusible, solid material and a second material, which can be a second fiberizable, fusible, solid material, a metal, a metal oxide, or the like.

It is, therefore, an object of the invention to provide an improved method for producing filaments of a fiberizable, fusible, solid material.

It is a further object of the invention to provide an improved method for producing two-phase filaments.

It is still another object of the invention to provide an improved method for producing filaments of a fiberizable, fusible, solid material by rotating a mass of the material while heating an exposed surface thereof to a temperature above its softening temperature, and extending longitudinally the streams that are thrown off centrifugally.

It is still another object of the invention to provide an improved method for producing metalized fibers of a fusible material.

Other objects and advantages will be apparent from the description which follows, reference being had to the accompanying drawings, in which—

FIG. 1 is a partially schematic fragmentary sectional view showing apparatus for rotating a mass of a substance to be fiberized while heating an exposed surface thereof, and extending longitudinally filament forming streams which are thrown off centrifugally to effect attenuation thereof.

FIG. 2 is a fragmentary view in elevation of a modification of the apparatus of FIG. 1 showing a heating means which is utilized also to attenuate streams of a fiberizable material which are thrown off centrifugally.

FIG. 3 is a view in vertical section showing apparatus for heating an exposed surface of a tube of a fiberizable material, for rotating the tube so that primary streams of the material are thrown off centrifugally, and for attenuating the streams.

FIG. 6 is a fragmentary vertical sectional view showing a modification of the apparatus of FIG. 5.

FIG. 7 is a view in vertical section showing a modified form of apparatus for rotating a mass of a fiberizable, fusible, solid material while heating an exposed surface thereof and extending longitudinally streams of the softened material which are thrown off centrifugally.

FIG. 8 is a vertical sectional view of apparatus similar to that shown in FIG. 5, modified as shown in FIG. 6, and provided also with an electric heating element disposed annularly with relation to the fiberizable material for preheating thereof in order to accelerate the rate of production of filaments.

FIG. 9 is a fragmentary view in vertical section showing a tube and a tube or rod from the apparatus of FIG. 5 or 6 modified by insertion in the annular space therebetween of a crystalline, or high modulus glassy, substance.

FIG. 10 is a partially schematic fragmentary view in vertical section showing apparatus wherein the continuous production of filaments is possible by virtue of provision for the sintering together of successive rods or tubes of material to be fiberized.

FIG. 11 is a fragmentary view in perspective showing apparatus for extending longitudinally by means of pulling wheels streams thrown off centrifugally from a surface of a fiberizable material heated above its softening temperature.

FIG. 12 is a fragmentary perspective view of apparatus for forming simultaneously filaments of a fiberizable material and, in intimate association with the filaments, masses of a molten metal.

FIG. 13 is a perspective view showing a modified relationship between a tube of a fiberizable material and a rod of metal which can be employed in the apparatus of FIG. 12.

FIG. 14 is a fragmentary perspective view showing apparatus for simultaneously fiberizing two separate masses of similar or dissimilar solid fusible materials.

FIG. 15 is a fragmentary view in perspective showing a different arrangement of two separate masses of a solid fusible material and a metal rod or wire intimately associated with the two masses, and which can be fiberized in the apparatus of FIG. 14.

FIG. 16 is a fragmentary perspective view showing a battery of three assemblies comprising a tube and a rod, at least one of which is composed of glass or other fiberizable material, and the other of which can be metal or the like.

FIG. 17 is a sectional view showing a tube of glass or other fiberizable material coated on its interior and exterior surfaces with metal or other similar material with which it is desired to coat fibers.

FIG. 18 is a view in section showing a rod of glass or other fiberizable material coated with a metal or other similar material with which it is desired to coat fibers.

FIG. 19 is a partially schematic view representing diagrammatically apparatus for producing and attenuating fibers in accordance with the invention and also forming an intimate association between the fibers and metal or other similar material.

FIG. 20 is a fragmentary plan view of apparatus for producing filaments of a fusible, fiberizable material intimately associated with filaments of a different fusible, fiberizable material or with some other different second material.

Figure 4:
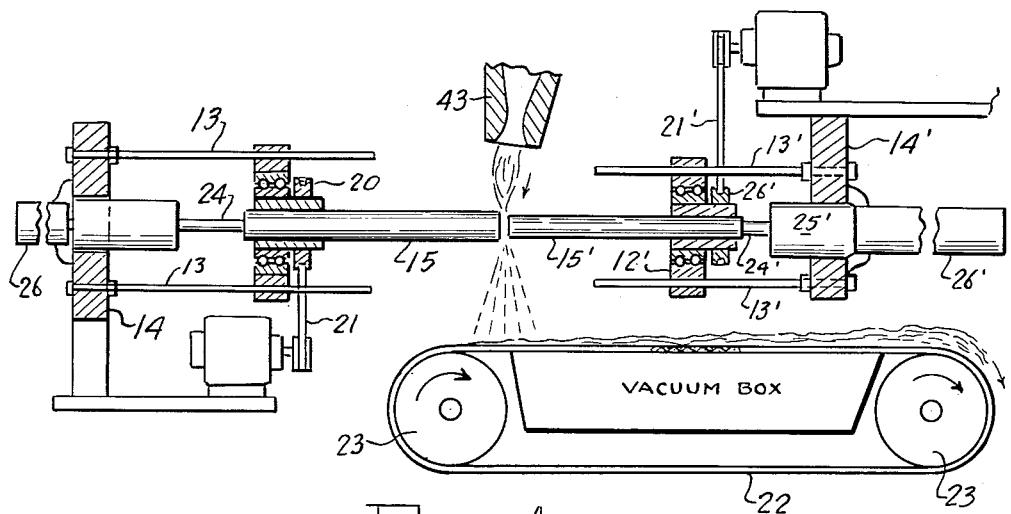
FIG. 4 is a vertical sectional view showing apparatus similar to that of FIG. 2, but modified by duplication thereof so that two masses of the material are brought into a heating zone.

Referring now in more detail to the drawings, apparatus shown in FIG. 1 for producing fibers of glass or other fiberizable fusible material comprises a chuck 11 suitably journaled to a platen 12 which is slidably mounted on rods 13 that are rigidly supported by a base 14. A rod or tube 15 of glass, or other fiberizable fusible material, is supported in the chuck 11. An annular burner 16 which extends longitudinally of the rod or tube 15 is supported in any suitable manner, and is provided with inlets 17 for a suitable fuel gas and air or oxygen. An annular blower or burner 18 having inlets 19 for air, steam, combustible gas mixtures or other fluid, is supported longitudinally of the burner 16, and spaced axially outwardly therefrom.

The burner 16, when ignited, directs a flame against the end portion of the rod 15, and softens a part of the fusible material. The chuck 11 is keyed or otherwise rigidly attached to a pulley 20 which carries a belt 21 driven in any suitable manner. When the belt 21 is driven, the pulley 20, the chuck 11, and the rod 15 are all rotated, and the part of the rod 15 that has been softened by the action of the burner 16 tends to be thrown off centrifugally from the rod or tube by virtue of the rotation thereof. In general, the fineness of the fibers produced is a direct function of the angular velocity of the rod or tube 15, and an inverse function of the radius thereof. Relatively fine fibers of the order of about 0.0001" or finer are produced by rotating a ¼ inch diameter rod at speeds in the order of 15,000 to 20,000 revolutions per minute, and substantially coarser fibers, together with substantial amounts of non-fibrous masses of the fusible material, are thrown off therefrom at speeds of the order of about 5000 or fewer revolutions per minute, depending upon the properties of the rod.

It has been found that, by discharging a high velocity stream of a compressible fluid such as air, steam or flame and combustion products through the annular blower or burner 18 to establish a relatively high velocity current of fluid concentric with the rod, and generally radial with respect to the end thereof, the fiber forming streams thrown off therefrom by centrifugal force, which results from rotation of the rod, can be extended longitudinally, or further attenuated, and the frequency of the occurrence of slugs or non-fibrous masses of the fusible material substantially reduced, or even eliminated. In addition, the blast of compressible fluid propels the further attenuated fibers against a foraminous conveyor 22, which is schematically represented as being driven in the direction of the arrows by drive wheels 23. The mass of fibers is drawn against the conveyor 22 by a vacuum box, and is discharged from the conveyor and further processed in any desired manner, or packaged.

The apparatus also includes means for advancing and withdrawing the rod or tube 15. A rod 24 is pinned to the platen 12, and to a piston acting in a cylinder 25. Hydraulic fluid under pressure from an accumulator 26 is admitted to one end or the other of the cylinder 25 to advance the platen 12 and keep the end of the tube or rod 15 appropriately positioned, with respect to rotation and lateral movement, for contact with the flame from the burner 16, or to withdraw the entire assembly for replacement of the rod 15 by a new rod or tube.

A modification of a portion of the apparatus of FIG. 1 is shown in FIG. 2, where the burner 16 and the blower 18 are replaced by a burner 27 which produces a high velocity blast of flame and combustion products. The flame from the burner 27 softens the end of the rod or tube 15; centrifugal force throws the softened material from the end thereof in fiber forming streams, and the blast from the burner 27 further attenuates the fibers and throws them against the conveyor 22. The portions of the apparatus of FIG. 2 which are not represented are identical with the corresponding portions of the apparatus of FIG. 1.

In the apparatus shown in FIG. 3, a glass tube 28 is suitably mounted in a sleeve 29 which is journaled to a movable carriage 30, and has a pulley 31 integral therewith. A tube 32 is engaged in a suitable plug 33 positioned in one end of the tube 28 of a fusible material, and rotates therewith when the pulley 31 is driven by a belt 34 and a motor 35, also mounted on the carriage 30. A second end of the tube 32 is suitably journaled to a support 36 which also constitutes a plenum chamber to which air or oxygen can be supplied, and from which it can pass into the interior of the tube 32. A stationary tube 37 passes through the rotating tube 32, and is connected to an appropriate source for fuel gas.

When the tube 28 is rotated, and the combustible mixture comprising a fuel gas and oxygen introduced into the interior of the tube 28 through the tube 37, and into the annular space between the exterior of the tube 37 and the interior of the tube 32, respectively, the combustible mixture can be burned at the open end of the tube 28 to heat and soften portions of the fusible material, which are then thrown off centrifugally in fiber forming streams in the manner described. The fuel/oxygen ratio and rate of feed thereof are so controlled to achieve burning at the open tube end. If desired, a cylindrical shield of metal, which may preferably be either magnetic or non-magnetic, depending upon conditions, can be disposed around the open end of the tube and heated inductively to aid in the softening of the tube for fiberization. The fiber forming streams are then picked up and further attenuated by an annular blower 38 which discharges a high velocity stream of air, steam, or other compressible fluid. This blast or compressible fluid not only further attenuates the fibers, but also carries and deposits them on a foraminous conveyor 39 schematically represented as being supported between two wheels 40. The carriage 30 is mounted on wheels 41, and attached to a suitable driving mechanism indicated generally at 42 for advancing the carriage, and with it the rod and associated apparatus, to keep the fiber forming end of the rod in proper spatial relationship with the blower 38. When a given rod 28 has been consumed, the entire assembly can be withdrawn to the left in FIG. 3, and replaced with a new tube.

Apparatus shown in FIG. 4 is similar to that of FIG. 1, modified as shown in FIG. 2, except that a burner 43 is positioned more nearly vertically, and except that a second rod is longitudinally aligned with the first, having an end near the end thereof. Parts of the apparatus which support the first rod are numbered in correspondence with FIG. 1, and corresponding parts which support the second rod are designated by a prime. When the rods are of two different glasses, a product that is a mixture of fibers of two different compositions can be produced, or fibers each of which is composed of two phases of different compositions can be produced. The burner 43 is one which produces a high velocity blast.

Figure 5:
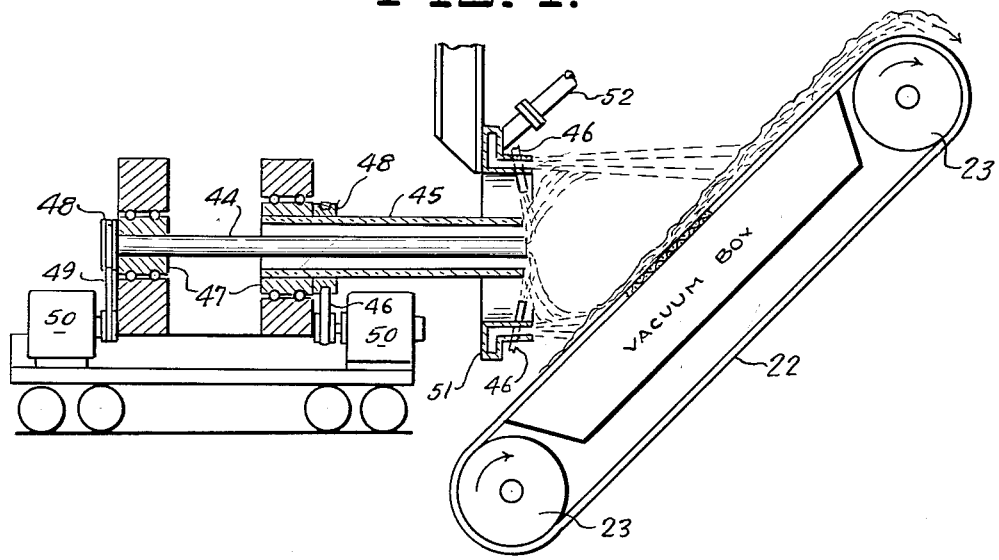
FIG. 5 is a view in vertical section showing a different type of apparatus for bringing two separate masses of a solid material into a heating zone.

The apparatus shown in FIG. 5 also provides for the production of fibers simultaneously from two different rotating masses of material, in this instance, a rotating rod or tube 44 positioned interiorly of a rotating tube 45. Burners 46 heat the end of the tube 45, as well as the end of the tube or rod 44, softening the material so that centrifugal force caused by rotation of each by means of chucks 47, pulleys 48, belts 49 and motors 50 throws off fiber forming streams, which are engaged by a blast from an annular blower 51 and thrown against a conveyor, as described. Air or other compressible fluid is supplied to the blower 51 through a line 52.

The modification shown in FIG 6 is adapted for use with the apparatus of FIG. 5. A single annular burner 53 which directs a high velocity blast in the direction of the arrows is used both to heat the end of the rod or tube 44 and the end of the tube 45, and to extend longitudinally or attenuate the fiber forming streams which are thrown off centrifugally.

The apparatus shown in FIG. 7 comprises a plurality of annularly disposed burners 54 each of which delivers a high velocity blast of flame and combustion products against the lower end of a vertically disposed tube or rod 55 of glass or other fiberizable, fusible material. The tube or rod 55 is supported in a chuck 56 carried by a shaft 57 of a motor 58, so that the rod 55 can be rotated to throw off centrifugally fiber forming streams which are then longitudinally extended or attenuated by the blast from the burners 54. The motor 58 is mounted on a plate 59 which is slidably carried by a member 60 carried by a suitable framework indicated generally at 61. The plate 59 can be advanced or withdrawn by means of a rod 62 carried by a suitable piston in a cylinder 63 to keep the end of the rod 55 appropriately positioned relative to the burners 54. The foraminous conveyor 22 is positioned generally horizontally. Filaments are collected thereon in the manner described.

A plurality of annularly disposed burners 64 are shown in FIG. 8 directed toward the end of a rod or tube 65. The tube or rod 65 is supported in a chuck 66 suitably journaled to a base support 67 which is carried on wheels or rolls 68. A pulley 69 is structurally integral with the chuck 66, and is driven by a belt 70 and a motor 71 to rotate the rod 65. A suitable combustible mixture is supplied to the burner 64 through a pipe 72. A preheater, which, in the embodiment shown, is an electric resistance element 73, is disposed annularly spaced from the tube or rod 65, between the burner 64 and the chuck 66. By passing an electric current through the element 73 from lines 74 and 75 the rod 65 can be preheated so that fiberization proceeds at a faster rate than would otherwise be possible. Instead of the resistance preheater 73, a similarly disposed inductive preheater could also be employed. Such inductive preheater could take the form of a metal sleeve surrounding the tube or rod and a suitably powered inductor disposed around and radially spaced from the sleeve. Such an inductor, or the resistance element 73 could, if desired, supply all the heat necessary to produce fibers in accordance with the invention.

Fragments of the tube or rod 44 and of the radially spaced tube 45 from FIGS. 5 and 6 are shown in FIG. 9. A crystalline, or high modulus glassy, substance 76 is disposed in the annular space therebetween. When the ends of the tube 45 and of the tube or rod 44 are heated in the manner described, with rotation, filaments are thrown off in the manner previously set forth in intimate association with the crystalline, or high modulus glassy, substance. Depending on the purpose to be served by the substance 76, its identity can vary substantially. For example, the substance 76 can be a powdered metal such as aluminum, lead, zinc, Woods metal or the like. In such case the metal particles may be either melted or adhered to the surfaces of the fibers or filaments formed, and thrown onto the foraminous conveyor in intimate association therewith, or as coatings thereon. In other instances it may be desired to modify the surface characteristics of the fibers or filaments formed, so that the substance 76 can be titanium dioxide, aluminum oxide, zirconium dioxide, fused silica, quartz, calcium aluminum silicate, or the like. Depending upon the temperatures involved, the identity of the substance 76, and the identity and physical characteristics of the fusible material of which the tube 45 and the tube or rod 44 are composed, the substance may be formed into a surface coating on the filaments produced, may be embedded therein, or may be merely intimately associated therewith. The rod 44 can be eliminated, if desired, and the entire interior of the tube 45 filled with the substance 76, or a tube filled with such a substance can be substituted for the rod 44.

It will be appreciated that the apparatus shown in FIGS. 1–8 of the drawings is capable of continuous production for only a limited period of time, depending upon the length and diameter of the rods or tubes of fiberizable fusible material employed. When one such rod or tube has been consumed in filament formation, it is necessary to stop the apparatus, remove the stub end of the tube or rod from the chuck in which it is supported, and replace it with a new tube or rod. The apparatus shown in FIG. 10 avoids this difficulty by supporting a tube or rod 77 of a fusible, fiberizable material in a chuck 78 which is suitably journaled and driven in any desired manner, with one end of the tube or rod 77 longitudinally aligned with a burner 79 and the other end thereof exposed. As the rod or tube 77 and chuck 78 are advanced in the direction of the arrow in FIG. 10 to keep the forward end of the rod appropriately positioned relative to the burner 79, the rear end thereof approaches and is ultimately aligned with heaters 80 which can be electric resistance elements, or any other suitable heat sources. A rod 81 suitably engaged in a chuck 82 is then advanced in the direction of the arrow until its forward end is also aligned with the heaters 80. Heat is then supplied to soften the rear end of the rod 77 and the forward end of the rod 81, and the chuck 82 and rod 81 are then further advanced until the rod ends abut. During this final advance of the rod 81 the chuck 82 is driven at the same number of revolutions per minute as the rod 77. Such rotation is then continued, while heat is no longer supplied through the heaters 80, so that the softened material solidifies and the rods 77 and 81 are firmly attached together. The chucks 78 and 82 are then sequentially released, withdrawn, and re-engaged with the rod, and alternately used to advance the rod or tube to keep its forward end appropriately aligned with the burner 79. The procedure can be repeated to enable continuous operation of the apparatus.

A rod or tube 83 is shown in FIG. 11 engaged in a chuck 84 which is rotated in any suitable manner to drive the tube or rod 83 in the direction of the arrow. A flame from a burner 85 is played on the end of the tube or rod 83 during such rotation, and filaments thrown off centrifugally from the surface of the tube or rod 83 are passed along the surface of a pad 86 and then between cooperating pulling wheels 87, which are driven in the direction of the arrows. The pulling wheels 87 exert a force on the filaments which is transmitted to and extends longitudinally the centrifugally thrown off fiber forming streams to increase the fineness of the filaments formed. After passing through the pulling wheels 87 the filaments are further engaged by feeders 87', driven in the directions indicated by the arrows, and further processed in any desired manner or packaged. Induction or resistance heating can, if desired, be employed instead of flame heating, and concentric tubes, or a rod and a concentric tube can be used in place of the tube or rod 83.

Three rods 88 of glass or other fiberizable material are shown in FIG. 12 engaged in a chuck 89 radially positioned relative to a wire or rod 90 of aluminum or other metal. By rotating the chuck 89 and playing a flame from a burner 91 on the ends of the rods 88 and of the wire or rod 90, filaments of a fiberizable material intimately associated with metal which may be adhered thereto as a surface coating or as globules, are formed. If desired, more than the three rods of glass shown can be similarly disposed about a metal rod or wire.

A tube 92 of glass or other fiberizable material is shown in FIG. 13 with a wire or rod 93 of metal suitably supported axially thereof. The tube 92 and wire or rod 93 can be supported in the manner shown in FIG. 5 for the tube 45 and tube or rod 44, or both can be engaged in a suitable manner in the chuck 89 of FIG. 12. Filaments of a fiberizable material intimately associated with metal can be produced by playing a flame on the ends of the tube 92 and the rod 93, while rotating each. If desired, where a high velocity burner blast of flame and combustion products is employed to attenuate fiber forming streams thrown off centrifugally from the tube 92 the rod or wire 93 can be stationary, and can be supported from either side of the flame.

Still another modification of apparatus for producing filaments according to the invention is shown in FIG. 14. A rod-like mass of glass or other fiberizable material, which is indicated generally by the numeral 94, is appropriately engaged in a chuck 95. The rod-like mass 94 is composed of two separate half rods 96 and 97, each of which is semi-circular in cross-section as is indicated in more detail by the enlarged perspective views thereof. The rod-like mass 94 can be engaged in the chuck 95 and rotated in any suitable manner while an exposed surface of the mass 94 is heated, for example, by a burner 98. Filaments composed partially of the material of each of the rod halves 96 and 97 are formed. Where the two rod halves are composed of different fusible fiberizable materials, and particularly where the materials have different coefficients of thermal expansion, filaments having interesting characteristics can be produced. For example, the filaments may be curled by virtue of the different thermal expansions, or part of the filament may adhere to one type of material, such as a synthetic resinous binder, while the other part thereof adheres to a different material, for example an inorganic binder. Similar results can be achieved with the structures shown in FIGS. 4, 5, 6, 9 and 12.

A modification of the procedure described in connection with FIG. 14 can be carried out using the assembly shown in FIG. 15, which is a rod-like mass 99 composed of two rod halves 100 and 101 and a wire or rod 102 of metal or of a fusible, fiberizable material embedded in a circular opening disposed generally along the axis of the rod-like body 99. This assembly can be utilized to produce the effects discussed above by virtue of differences in properties of the materials of which the two rod halves 101 are composed, as discussed in the preceding paragraph, and can also be used to produce filaments in intimate association with metal as discussed in connection with FIGS. 12 and 13.

As is shown in FIG. 16, the assembly of FIG. 13, or, if desired, of FIGS. 12, 14 and 15, can be multiplied by providing a plurality of tubes 92, 92′ and 92″ of glass or other fiberizable material with wires or rods of metal 93, 93′ and 93″ axially disposed relative to the tubes. By rotating the various tubes, and, if desired, the various rods, the effects achieved by utilizing fiberizable materials having different properties, and even intimately associated with different metals, can be multiplied.

A tube 105 of glass or other similar material carrying interior and exterior metal coatings 106 and 107, respectively, is shown in FIG. 17. The coated tube can be rotated while an exposed surface thereof is heated in any of the waves previously described. By appropriately regulating both the rates of rotation and of heating, masses comprising filaments of glass intimately associated with metal, in the form of coatings or globules, which latter can be adhered to the filaments, can be produced.

A rod 108 of glass or other similar material is shown in FIG. 18 coated with a metal 109. Filaments of the fusible material of which the rod 108 is composed can be produced, in intimate association with metal, by rotating the rod while heating an exposed surface thereof, in any of the ways previously described.

Referring now to FIG. 19, a tube or rod 110 of glass or other suitable fiberizable material is shown fragmentarily with an end extending into the region of high velocity blast from a burner indicated generally at 111, which can be, for example, of the type disclosed in U.S. Patent 2,489,242, or in U.S. Patent 2,489,243. The rod 110 can be supported and rotated in any of the ways previously described. Lengths of wire 112 are passed from a reel 113 over a roll 114, and downwardly along a suitable guide 115 into the blast from the burner 111. The burner blast softens a portion of the surface of the rod or tube 110 so that such softened material is thrown off centrifugally by virtue of the rotation thereof, and the centrifugally thrown off material is extended longitudinally and further attenuated by the burner blast, which also melts and projects, in intimate association with filaments formed from the tube or rod 110, molten metal from the wires 112. The resulting products can be collected in any suitable manner, for example on a conveyor of the type previously described.

The apparatus fragmentarily shown in FIG. 20 comprises two burners, indicated generally at 116, which can be of the same type as the burner 111, and a pair of rods or tubes 117 and 118 suitably supported in any appropriate manner for rotation as previously described. The burners 116 are so positioned relative to one another that their high velocity blasts cross and form a single high velocity stream of combustion products which substantially surrounds and softens the ends of the rods or tubes 117 and 118. By virtue of the rotation of the tubes or rods 117 and 118 the softened material is thrown off centrifugally in fiber-forming streams into the blast, and is further attentuated thereby. If desired, the burners 116 can be tipped slightly so that the axis of the blast from one is slightly higher than the axis of the blast from the other, with the result that the single resultant blast has a swirling motion which causes filaments from the tube or rod 117 to be twisted and matted with filaments from the tube or rod 118. When the tube or rod 117 is of a different material than the tube or rod 118, composite wool-like materials having interesting properties can be produced.

It will be appreciated that the apparatus represented in FIG. 19 can be employed in conjunction with the apparatus shown in the various other views of the drawing, and previously described, to introduce molten metal in intimate association with attenuating filaments of glass or other similar material. Also, materials other than metal can be introduced in this manner to modify in a suitable way the characteristics of filaments of glass or other material. The specific apparatus shown in FIG. 19 is not essential to achieving such a result, as metalizing guns wherein a wire of metal or other material is fed into the interior thereof, melted, and discharged in a molten state suspended in a high velocity blast of combustion products, and other equivalent apparatus can also be so employed.

It will be apparent that various changes and modifications can be made from the specific details disclosed in the attached drawings, and discussed in connection therewith, without departing from the spirit of the invention. In one aspect the invention provides a method for producing filaments of a fiberizable, fusible, solid material which comprises rotating a mass of the solid fusible material while heating an exposed surface thereof to a temperature in excess of the softening temperature of the material, the rate of rotation of the mass being sufficiently high that the softened material is thrown off centrifugally in filament forming streams, and extending the streams longitudinally to effect attenuation thereof. In another aspect the invention provides a method for producing filaments which includes the steps of rotating a mass comprising a fiberizable, fusible, solid material and a second substance, and heating an exposed surface of the mass to a temperature in excess of the softening temperature of the material, the rate of rotation of the mass being sufficiently high that the softened material is thrown off centrifugally in filament forming streams in intimate association with the substance.

What I claim is:

1. A method for producing filaments of a fiberizable, fusible, solid material which comprises rotating a mass of the solid fusible material while directing a high velocity blast of hot combustion products against an exposed surface thereof to heat said surface to a temperature in excess of the softening temperature of the material, the rate of rotation of the mass being sufficiently high that the softened material is thrown off centrifugally in filament-forming streams which are then extended longitudinally and attenuated by the blast.

2. A method for producing filaments comprising two different fiberizable, fusible, solid materials which comprises rotating separate masses of each of the solid fusible materials, heating an exposed surface of each to a temperature in excess of its softening temperature while directing a high velocity gaseous blast against the heated masses, the rate of rotation of the masses being sufficiently high that the softened materials are thrown off centrifugally and are attenuated into filaments as a result partially of the forces exerted by rotation of the masses and partially of the forces exerted by the gaseous blast.

3. A method for producing filaments of a fiberizable fusible solid material which comprises heating an exposed surface of a mass of such material to a temperature in excess of the softening temperature of the material, while directing a high velocity gaseous blast against the heated mass, and rotating said mass within the path of the gaseous blast at a rotary speed such that softened material is attenuated into filaments as a result partially of the forces exerted thereon by rotation of the mass and partially of the forces exerted thereon by the gaseous blast.

4. A method as claimed in claim 3 wherein the gaseous blast is of such magnitude and is so directed as to convey said attenuated filaments to a collection zone.

5. A method for producing fusible filaments comprising a fiberizable material and a different substance which includes the steps of heating a mass comprising the material and the substance to a temperature in excess of the softening temperatures of both, while directing a high velocity gaseous blast against the heated mass, and rotating the mass within the path of the gaseous blast at a rate such that the softened materials are attenuated into filaments as a result partially of the forces exerted thereon by rotation of the mass and partially of the forces exerted thereon by the gaseous blast.

References Cited in the file of this patent

UNITED STATES PATENTS

| | | |
|---|---|---|
| 2,497,369 | Peyches | Feb. 14, 1950 |
| 2,530,345 | Watts | Nov. 14, 1950 |
| 2,609,566 | Slayter et al. | Sept. 9, 1952 |
| 2,624,912 | Heymes et al. | Jan. 13, 1953 |
| 2,682,079 | Richardson | June 29, 1954 |
| 2,724,866 | Stephens | Nov. 29, 1955 |

FOREIGN PATENTS

| | | |
|---|---|---|
| 610,845 | Great Britain | Oct. 21, 1948 |